(12) United States Patent
Huibers

(10) Patent No.: US 7,751,113 B2
(45) Date of Patent: Jul. 6, 2010

(54) MICROMIRRORS HAVING MIRROR PLATES WITH TAPERED EDGES

(75) Inventor: Andrew Huibers, Palo Alto, CA (US)

(73) Assignee: Texas Instruments Incorporated, Dallas, TX (US)

( * ) Notice: Subject to any disclaimer, the term of this patent is extended or adjusted under 35 U.S.C. 154(b) by 499 days.

(21) Appl. No.: 11/625,964

(22) Filed: Jan. 23, 2007

(65) Prior Publication Data

US 2007/0171508 A1    Jul. 26, 2007

Related U.S. Application Data

(60) Provisional application No. 60/761,493, filed on Jan. 23, 2006.

(51) Int. Cl.
*G02B 7/02* (2006.01)

(52) U.S. Cl. .................. 359/291; 359/290; 359/223; 359/224

(58) Field of Classification Search ............... 359/238, 359/290, 291, 223, 224
See application file for complete search history.

(56) References Cited

U.S. PATENT DOCUMENTS

| | | | | |
|---|---|---|---|---|
| 6,650,461 B2 * | 11/2003 | Atobe et al. | ................. | 359/291 |
| 7,064,880 B2 * | 6/2006 | Mushika | ..................... | 359/237 |
| 7,391,578 B2 * | 6/2008 | Yamada | ..................... | 359/689 |
| 7,529,011 B2 * | 5/2009 | Fujii | ......................... | 359/846 |
| 2002/0130561 A1 * | 9/2002 | Temesvary et al. | ............ | 310/12 |
| 2003/0222980 A1 * | 12/2003 | Miyagaki et al. | ............ | 348/115 |
| 2005/0195465 A1 * | 9/2005 | Rabinowitz | ................. | 359/291 |

FOREIGN PATENT DOCUMENTS

DE        3812764        * 10/1989

OTHER PUBLICATIONS

DE 3812764, Abstract, Oct. 26, 1989.*

* cited by examiner

*Primary Examiner*—Timothy J Thompson
(74) *Attorney, Agent, or Firm*—Charles A. Brill; Wade James Brady, III; Frederick J. Telecky, Jr.

(57) ABSTRACT

Disclosed herein is a micromirror device having a reflective mirror plate with reduced dimensions. The micromirror device can be a member of an array of micromirror devices for use in optical signal modulations, such as display applications and optical signal switching applications.

9 Claims, 14 Drawing Sheets

MICROMIRRORS HAVING MIRROR PLATES WITH TAPERED EDGES

CROSS-REFERENCE TO RELATED APPLICATIONS

This US patent application claims priority under 35 U.S.C. 119(e) from U.S. provisional application Ser. No. 60/761,493 to Huibers filed Jan. 23, 2006, the subject matter being incorporated herein by reference in its entirety.

TECHNICAL FIELD

The technical field of the examples to be disclosed in the following sections is related generally to the art of microelectromechanical devices, and, more particularly, to micromirror devices used in display systems.

BACKGROUND

The ratio of luminance between the brightest white in a display system to the darkest black that can be produced is called the contrast ratio. In a micromirror based display system, higher contrast ratios can be achieved when there is a larger difference in angle between light reflected from the mirrors in their ON state and light reflected from the mirror in the OFF state. One way to increase the difference in reflected angles is by having the micromirrors be electrostatically deflected in opposite directions (to ON and OFF states) from a non-deflected state.

Micromirror based display systems employ an array of reflective and deflectable mirror plates for modulating the incident light so as to produce the desired image. Often times, the light is incident onto the mirror plates at certain angles. In this instance, vertical side walls of the mirror plates may be exposed to the incident light—resulting in unwanted light scattering. The scattered light, in turn, reduces the contrast ratio.

SUMMARY

In one example, a projection system comprises: a light source for producing light; an array of reflective and deflectable mirror plates for modulating the light, each mirror plate comprising a reflective surface and a side wall; a screen on which the modulated light is projected so as to form an image; and wherein a side wall of one of the array of mirror plates comprises first and second portions, said first portion being capable of blocking at least a portion of the light incident to the side wall and creating a shadow on the second portion of the side wall.

In another example, a spatial light modulator is disclosed herein. The spatial light modulator comprises: an array of micromirror devices, one of which comprises: a reflective mirror plate having a reflective surface and a side wall; an addressing electrode on a semiconductor substrate for electrostatically moving the mirror plate; and wherein the side wall comprises a notch that is composed of first and second surfaces disposed substantially perpendicular to each other, said notch facing the substrate.

In yet another example, a projection system is disclosed herein. The system comprises: a light source capable of producing light; a spatial light modulator for modulating the light, further comprising an array of deflectable and reflective mirror plates, at least one of which has a reflective surface and a side wall, wherein the side wall has an acute angle $\theta$ to the reflective surface, said acute angle $\theta$ satisfying: $\theta \leq 90° - \phi - \omega_{OFF} - \beta$, wherein $\phi$ is an angle between the central axis of an incident light and the normal direction of the mirror plate; wherein $\omega_{OFF}$ is an OFF state angle; and $\beta$ is angle between the central axis of an incident light cone and an edge ray; and a screen on which the modulated light in projected so as to form an image.

In still yet another example, a spatial light modulator is disclosed herein. The spatial light modulator comprises: an array of micromirror devices, at least one of which comprises: a mirror plate having a reflective surface and a side wall, wherein the side wall has an acute angle $\theta$ of from 32° degrees to 80° to the reflective surface; and an addressing electrode disposed proximate to the mirror plate for electrostatically moving the mirror plate.

In yet another example, a method of fabricating a micromirror device is disclosed herein. The method comprises: providing a light transmissive substrate; depositing a sacrificial layer; depositing a mirror plate layer with a reflective surface on the sacrificial layer and light transmissive substrate; patterning the mirror plate layer into a mirror plate with a pre-determined shape with a side wall of the patterned mirror plate having an acute angle from 32° degrees to 80° degrees to a reflective surface of the mirror plate; forming a deformable hinge and a post on the light transmissive substrate and sacrificial layer; and removing the sacrificial layer so as to release the device.

In yet another example, a method for making a micromirror device is disclosed herein. The method comprises: providing a light transmissive substrate; depositing a sacrificial layer on the substrate; forming a first mirror plate layer with a top and bottom surfaces on the sacrificial layer, said bottom surface contacting the sacrificial layer; forming a second mirror plate layer with a top and bottom surfaces on the sacrificial layer and first mirror plate layer, said bottom surface of the second mirror plate layer contacting the top surface of the first mirror plate layer; wherein the top surface of the formed second mirror plate layer has a smaller area than the bottom surface of the formed first mirror plate layer; forming another member of the device; and removing the sacrificial layer so as to release the micromirror device.

In yet another example, a method of forming a micromirror device is disclosed. The method comprises: providing a semiconductor substrate having formed thereon an addressing electrode; depositing a first sacrificial layer on the semiconductor substrate; depositing a second sacrificial layer on the first sacrificial layer; patterning the second sacrificial layer according to a pre-determined shape of a mirror plate such that, the patterned sacrificial layer has a side wall that has an acute angle to the surface of the first sacrificial layer, said acute angle is from 32° degrees to 80° degrees; forming a mirror plate on the first and second sacrificial layers; forming another member of the micromirror device; and removing the first and second sacrificial layers so as to release the micromirror device.

In yet another example, a system is disclosed. The system comprises: a substrate; a reflective and deflectable mirror plate attached to a deformable hinge one the substrate such that the mirror plate is capable of moving relative to the substrate; wherein the mirror plate has an edge whose thickness reduces over a distance along the length of the mirror plate, wherein said distance is from 100 nanometers to 1000 nanometers; and an addressing electrode placed proximate to the mirror plate for electrostatically moving the mirror plate.

In yet another example, a system is disclosed herein. The system comprises: a substrate; a reflective and deflectable mirror plate attached to a deformable hinge one the substrate such that the mirror plate is capable of moving relative to the substrate; wherein the mirror plate has a tapered portion at an edge such that the minimum transmissive rate of the tapered portion to the visible light is 70% or more; and an addressing electrode placed proximate to the mirror plate for electrostatically moving the mirror plate.

BRIEF DESCRIPTION OF THE DRAWINGS

FIG. 11b illustrates a top view of a portion of an array of addressing electrodes and circuitry for addressing the micromirrors of the micromirror array in FIG. 11a;

DETAILED DESCRIPTION OF EXAMPLES

Figure 1:
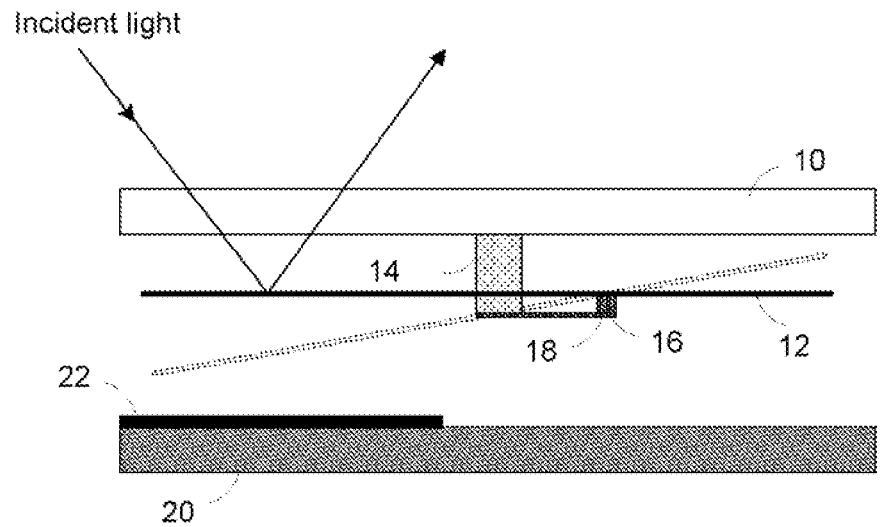
FIG. 1 is a cross-sectional view of an exemplary micromirror device.

Turning to the drawings, FIG. 1 schematically illustrates a cross-sectional view of an exemplary micromirror device. The micromirror device comprises light transmissive substrate 10, such as glass, quartz, and sapphire. Mirror plate 12 having a light reflective surface is attached to deformable hinge 18 via hinge contact 16. The deformable hinge is connected to and supported by the hinge support that is affixed to post 14 on the light transmissive substrate.

Addressing electrode 22 formed on semiconductor substrate 20 is disposed proximate to the mirror plate such that the mirror plate can be moved by an electrostatic torque derived from an electrostatic field established between the mirror plate and the addressing electrode. For maintaining a constant and uniform distance between the light transmissive substrate and semiconductor substrate, the two substrates can be bonded with a spacer, which is not shown in the figure for simplicity.

When used in optical signal modulation, the incident light passes through the light transmissive substrate and impinges the reflective surface of the mirror plate. By moving the mirror plate to different angels, such as the ON and OFF state angles (corresponding to the ON and OFF states), the incident light can be reflected to different pre-determined directions. However, in addition to the light reflected from the reflective mirror plate, the incident light can be scattered by the components of the micromirror, such as the side walls of the mirror plates exposed to the incident light. This problem of unwanted light scattering from the side walls of the mirror plate can be avoided or depressed by tapering the side walls of the mirror plate inwards such that the side walls are not exposed to the incident light. An exemplary mirror plate usable in micromirror in FIG. 1 is demonstratively illustrated in FIG. 2A.

Figure 2A:
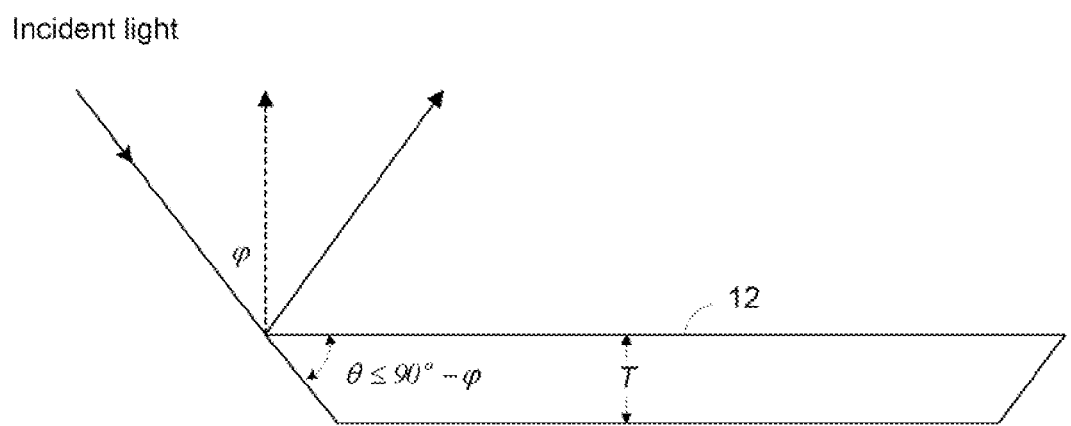
FIG. 2A is a cross-sectional view of an exemplary mirror plate.

Referring to FIG. 2A, the side walls of mirror plate 12 are tapered inwards—forming acute angles to the top reflective surface. Specifically, the left side wall exhibits an acute angle θ to the top reflective surface. The acute angle θ preferably, though not necessarily, depends upon the incident light angle ϕ, which is defined as the angle between the incident light and the normal direction of the reflective surface of the mirror plate. When the incident light is a cone of light, angle ϕ is defined as the minimum angle between the edge of the cone of light and the normal direction of the reflective surface of the mirror plate. In one example, the acute angle between the tapered side wall of the mirror plate is equal to or less than the complementary angle of the incident angle, which can be expressed as: $\theta \leq (90° - \phi)$.

In operation, the mirror plate is operated between an ON state and OFF state. When the mirror plate is rotated to the ON or OFF state angles, the side walls of the mirror plate as described in FIG. 2A may still be exposed to the incident light, as demonstratively illustrated in FIG. 2B.

Figure 2B:
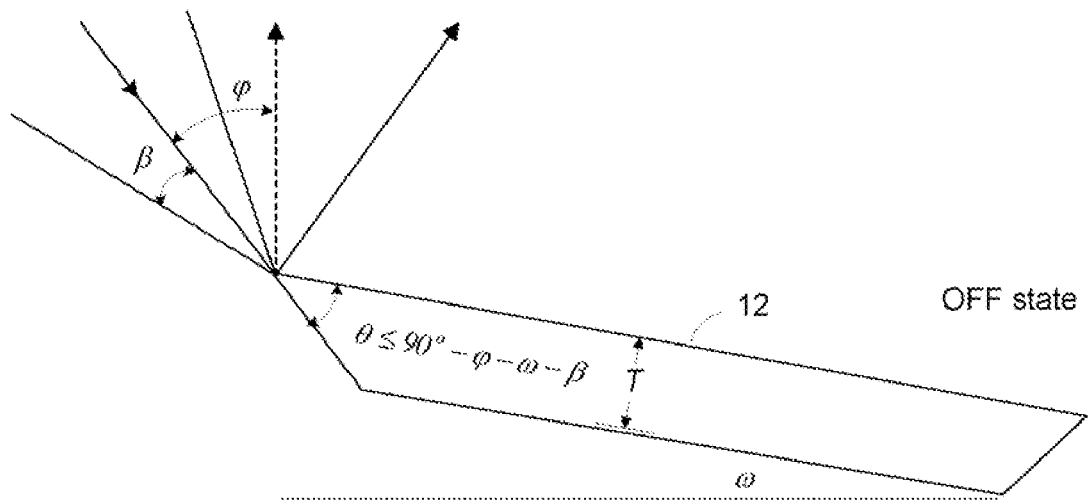
FIG. 2B is a cross-sectional view of an exemplary mirror plate.

Referring to FIG. 2B, mirror plate 12 is rotated the OFF state, having an OFF state angle $\omega_{OFF}$ to the horizontal plane (e.g. the plane of the substrate on which the mirror plate is formed). To avoid exposing the side wall of the mirror plate to the incident light, the acute angle θ preferably satisfies the equation of: $\theta \leq 90° - \phi - \omega_{OFF}$.

Often times, the incident light is in a form of a cone having a half-cone angle β that is defined as the angle between the edge ray and the central axis of the cone, as shown in the figure, the acute angle θ preferably satisfies the equation of: $\theta \leq 90° - \phi - \omega_{OFF} - \beta$.

In view of the above, exemplary θ can be 20° degrees or higher, such as 30° degrees or higher, 35° degrees or higher, 40° degrees or higher, 42° degrees or higher, 46° degrees or higher, 58° degrees or higher, 65° degrees or higher, and 75° degrees or higher, or from 32° degrees to 80° degrees.

Figure 2C:
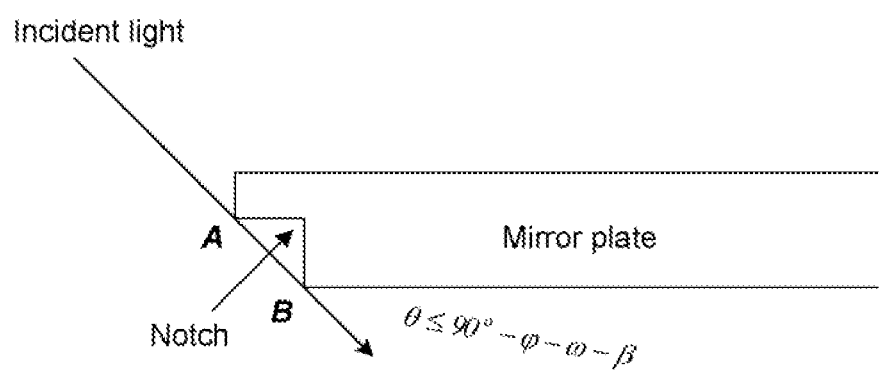
FIG. 2C is a cross-sectional view of an exemplary mirror plate.

In the above discussion with reference to FIGS. 2A and 2B, the tapered side walls of the mirror plates are continuous and flat. Alternatively, the side wall of the mirror plate exposed to the incident light can be stepwise with a notch as shown in FIG. 2C. Similar to those discussed with reference to FIG. 2A and FIG. 2B, the side wall of the mirror plate is formed such that a virtual line connecting the edges (e.g. point A and B) of the notch has an angle θ that preferably satisfies θ≦90°−φ−$\omega_{OFF}$−β. The notch is preferably formed so as to face the substrate having formed thereon the addressing electrode, such as a semiconductor substrate.

Figure 2D:
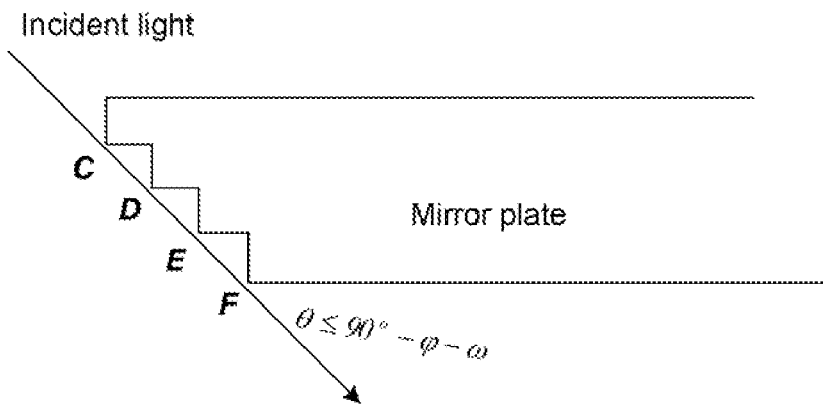
FIG. 2D is a cross-sectional view of an exemplary mirror plate.

Alternative to a single notch, the side wall of the mirror plate exposed to the incident light may be composed of multiple notches, as shown in FIG. 2D. Referring to FIG. 2D, multiple notches in the side wall of the mirror plate are formed. The notches have edges represented by C, D, E, and F. A virtual line connecting the edges C, D, E, and F of the notches has an angle θ that preferably satisfies θ≦90°−φ−$\omega_{OFF}$−β.

Figure 2E:
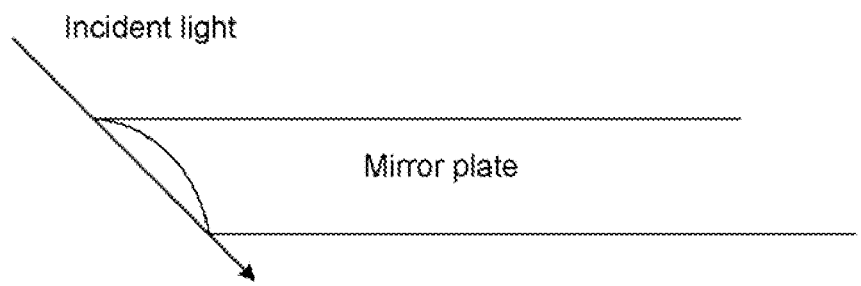
FIG. 2E is a cross-sectional view of an exemplary mirror plate.

Alternative to form the side wall step-wise as shown in FIGS. 2C and 2D, and continuous as shown in FIG. 2A and FIG. 2B, the side wall of the mirror plate can be of other suitable shapes, in which instance it is preferred that substantially all parts of the side wall exposed to the incident light are on the same side of the incident light as the reflective surface so as to hide the side wall from the incident light. Another exemplary side wall is demonstratively illustrated in FIG. 2E. Referring to FIG. 2E, the side wall of the mirror plate exposed to the incident light is curved inwards such that substantially no parts of the side wall are exposed to the incident light.

The unwanted light scattering can be further reduced by reducing the thickness T of the mirror plate such that, the total area of the said wall exposed to the incident light can be reduced, which in turn, reduce the possibility of unwanted light scattering. As an example, the thickness of the mirror plate can be 10,000 angstroms or less, such as 8000 angstroms or less, or 4500 angstroms or less. The area of each side wall is preferably 200,000 square-angstroms or less, such as 140,000 square-angstroms or less, or 116,800 square-angstroms or less.

In addition to the side walls, the edge of the mirror plate may also cause unwanted light scattering. For this purpose, it is preferred that the incident light impinges the mirror plate at an angle such that no edges are perpendicular to the incident light. When the incident light is a cone of light, it is preferred that no mirror edges are perpendicular to the center of the light cone. An favorable configuration is such that the incident light impinges the mirror plate along a corner of the mirror plate, as shown in an exploded view of the mirror plate in FIG. 2F.

Figure 2F:
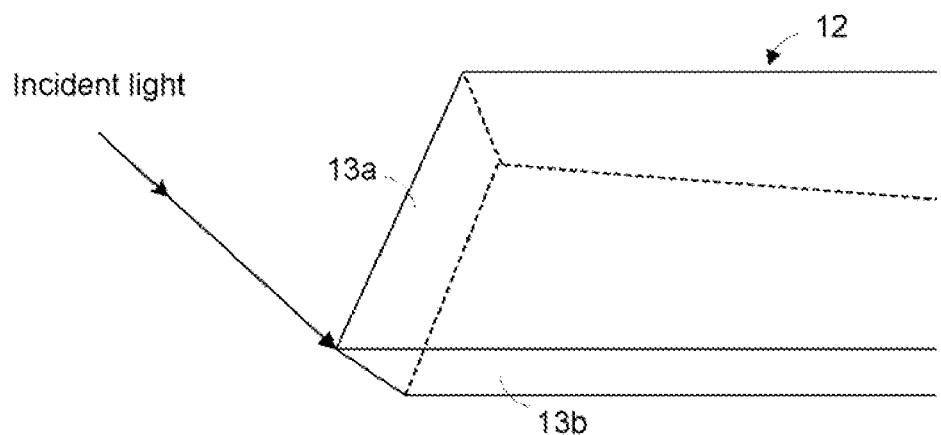
FIG. 2F is schematically illustrates a portion of a mirror plate.

Referring to FIG. 2F, the incident light illuminates the mirror plate from a corner of the mirror plate. In this configuration, multiple side walls of the mirror plates, such as side walls 13a and 13b, are exposed to the incident light. To avoid unwanted light scattering from these exposed side walls, these side walls can be tapered. Each tapered side wall has an acute angle to the reflective surface of the mirror plate, and preferably be equal to or less than the complementary angle of the incident light angle.

In light modulation operations where incident light impinges the mirror plate, at least a portion of the incident light is blocked by a portion, but not all, of the side wall. Because of such blocking, the incident light results in a shadow on at least a portion of the tapered side wall—that is, the shadowed portion is hidden from the incident light. As a result, the unwanted light scattering from the shadowed portion can be eliminated. In terms of the illumination energy, only a portion of the illumination intensity of the incident light is delivered to the side wall of the tapered mirror plate; and the other portion of the illumination energy misses the tapered side wall.

The unwanted light scattering can be further eliminated by coating the mirror plate edges with a light absorbing/blocking film, as that set forth in U.S. patent application Ser. No. 10/305,509 filed Nov. 26, 2002, the subject matter being incorporated herein by reference. In particular, the portion of the tapered mirror plate exposed to the incident light, such as the tip of the tapered mirror plate, can be coated with a light absorbing and/or reflection material.

The mirror plate can be a multi-layered structure, which may comprise a reflective layer and mechanical enhancing layer. For example, the mirror plate may comprise a $TiN_x$ layer with a thickness from 150 to 800 angstroms, a titanium layer with a thickness from 20 to 150 angstroms, an aluminum layer with a thickness from 1000 to 5000 angstroms, and a silicon oxide layer with a thickness from 10° to 800 angstroms.

The mirror plate can be implemented in a variety of micromirror devices. For example, other than the micromirror device shown in FIG. 1 wherein the mirror plate is formed on a light transmissive substrate, the mirror plate can be formed on the same substrate of the addressing electrode, such as a standard semiconductor substrate (e.g. silicon), on which standard integrated circuitry can be fabricated. Alternatively, the mirror plate can be a single crystal, such as crystal silicon. In this instance, the single crystal mirror plate can be derived from the same single crystal of the deformable hinge.

In the example shown in FIG. 1, the mirror plate is formed in a separate plane of the deformable hinge such that the deformable hinge is hidden from the incident light. This configuration avoids potential light scattering from the deformable hinge. Alternatively, the mirror plate can be formed in the same plane. For example, the mirror plate and deformable hinge can be derived from a same piece of material, such as a single crystal plate and a layer of thin film.

In the example shown in FIG. 1, the mirror plate is attached to the deformable hinge with the attachment point away from the center of the mirror plate such that the mirror plate is capable of rotating asymmetrically. In an alternative embodiment, the mirror plate can be attached to the deformable with the attachment point substantially at the geometric center of the mirror plate such that the mirror plate is capable of rotating symmetrically. Rotation of the mirror plate can be achieved by an addressing electrode (e.g. addressing electrode 22 in FIG. 1) or by multiple electrodes. For example, another addressing electrode can be disposed on the semiconductor substrate but one the opposite of the deformable hinge. Alternatively, a light transmissive electrode can be disposed on the light transmissive substrate for rotating the mirror plate towards the light transmissive substrate. Other configurations for multiple electrodes in a single micromirror device are also applicable.

Figure 3:
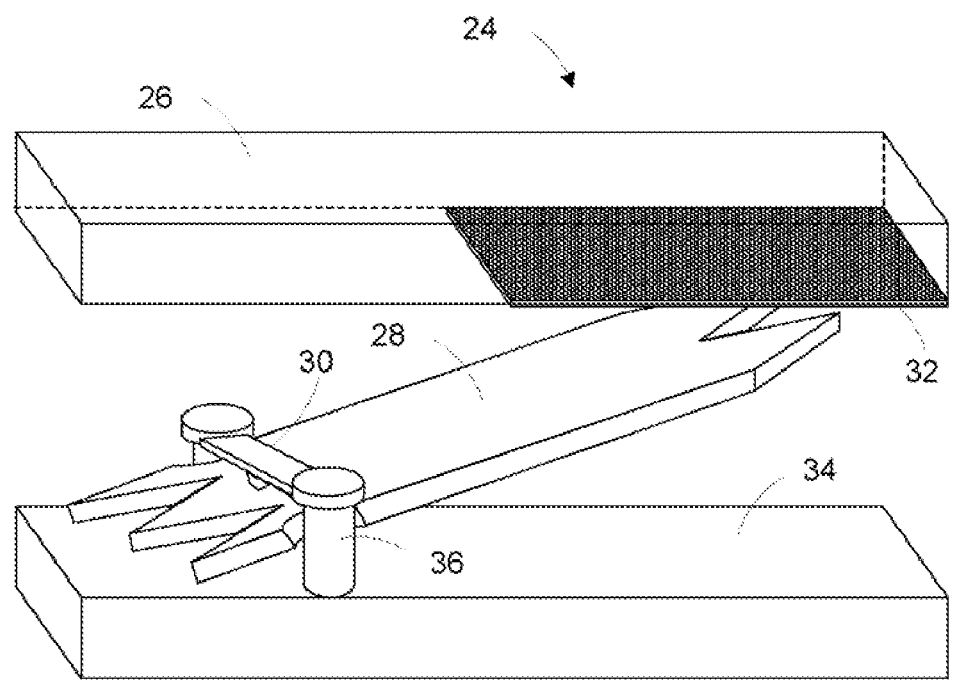
FIG. 3 illustrates a perspective view of a micromirror device having the mirror plate in FIG. 2A.

As a way of example, a micromirror device having the mirror plate is demonstratively illustrated in FIG. 3. Referring to FIG. 3, a perspective view of an exemplary micromirror device is illustrated therein. Micromirror device 24 comprises substrate 34 that is a light transmissive substrate such as glass, quartz, and sapphire and semiconductor substrate 26, such as silicon substrate. Deflectable and reflective mirror plate 28 is spaced apart and attached to deformable hinge 30 via a hinge contact. The deformable hinge is affixed to and held by posts 36. The semiconductor substrate has addressing electrode 32 for deflecting the mirror plate. A light blocking pad can be formed between the surface of the post and substrate for reducing the light scattering from the exposed surface of the posts.

Figure 4:
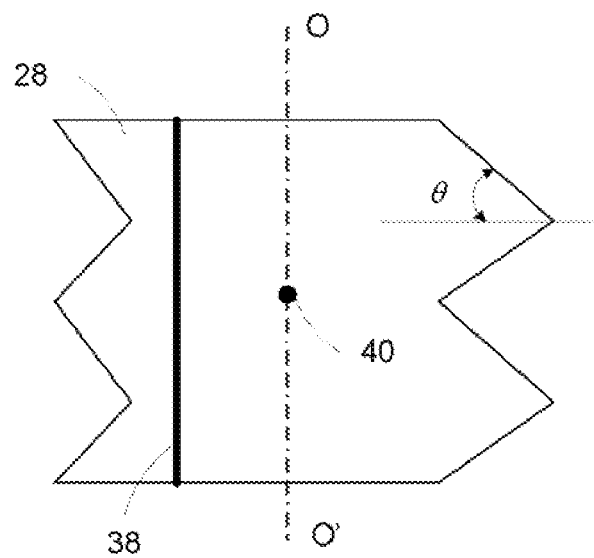
FIG. 4 shows a top view of the mirror plate in FIG. 3.

A top view of the micromirror in FIG. 3 is illustrated in FIG. 4. As can be seen in FIG. 4, deformable hinge 38 is not along but offset from the symmetrical axis OO' of mirror plate 28 such that the mirror plate is operable to rotate asymmetrically. The deformable hinge is located beneath the mirror plate in the direction of the incident light. That is, the mirror plate is located between the light transmissive substrate and the deformable hinge such that the deformable hinge is not illuminated by the incident light so as to prevent unexpected light scattering from the deformable hinge, thereby, increasing the contrast ratio of the produced image. The quality of the produced image is further improved through reduction of the light scattering from the edges of the mirror plate by forming the edges of the mirror plate into a zigzag shape, as shown in the figure.

The deflectable and reflective mirror plate can be a multi-layered structure. For example, the mirror plate may comprise an electrical conducting layer, a reflective layer that is capable of reflecting 85% or more, or 90% or more, or 94% or more, or 99% or more of the incident light (e.g. incident visible light), a mechanical enhancing layer that enhances the mechanical properties of the mirror plate. An exemplary mirror plate can be a multilayered structure comprising a $SiO_2$ layer, an aluminum layer, a titanium layer, and a titanium nitride layer. When aluminum is used for the mirror plate; and amorphous silicon is used as the sacrificial material, diffusion between the aluminum layer and the sacrificial material may occur. This can be avoided by depositing a barrier layer therebetween.

Figure 5:
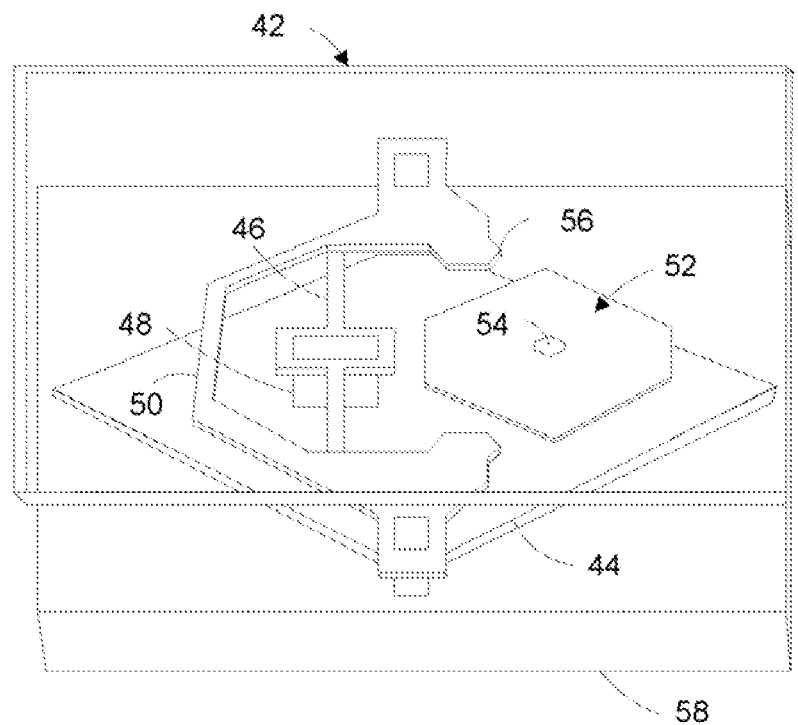
FIG. 5 illustrates a perspective view of a micromirror device having the mirror plate in FIG. 2A.

Another exemplary micromirror device having a cross-sectional view of FIG. 1 is illustrated in its perspective view in FIG. 5. Referring to FIG. 5, deflectable reflective mirror plate 44 with a substantially square shape is formed on light transmissive substrate 58, and is attached to deformable hinge 46 via hinge contact 48. The deformable hinge is held by hinge support 50, and the hinge support is affixed and held by posts 40 on the light transmissive substrate. For electrostatically deflecting the mirror plate, an addressing electrode (not shown in the figure for simplicity purposes) is fabricated in the semiconductor substrate 42. For improving the electrical coupling of the deflectable mirror plate to the electrostatic field, extending metallic plate 52 can be formed on the mirror plate and contacted to the mirror plate via post 54. A light blocking pad can be disposed between the surface of the post and substrate 58 so as to reduce unexpected light scattering from the post. The light blocking pad can also be deployed in a way so as to block light scattered from other portions of the micromirror, such as the tips (or the corners) of the mirror plate of the micromirror, and the exterior surfaces (e.g. the walls) of the posts.

Figure 6:
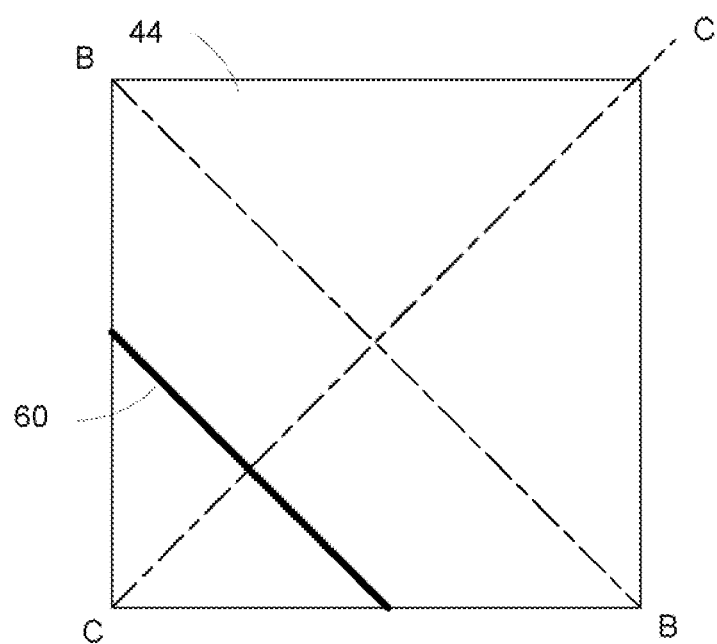
FIG. 6 shows a top view of the mirror plate in FIG. 3.

The mirror plate is preferably attached to the deformable hinge asymmetrically such that the mirror plate can be rotated asymmetrically for achieving high contrast ratio. The asymmetric attachment is better illustrated in FIG. 6. Referring to FIG. 6, mirror plate comprises diagonals BB and CC. Deformable hinge is disposed with its length parallel to a diagonal (e.g. BB) of the mirror plate. However, the length of the deformable is not along any diagonal of the mirror plate in the top view when the mirror plate is parallel to the light transmissive substrate. Of course, the mirror plate can be attached to the deformable hinge symmetrically by placing the attachment point around the geometric or mass center of the mirror plate, which will not be discussed in detail herein.

Similar to that shown in FIG. 3, the deformable hinge is preferably formed beneath the deflectable mirror plate in the direction of the incident light so as to avoid unexpected light scattering by the deformable hinge. For reducing unexpected light scattering of the mirror plate edge, the illumination light is preferably incident onto the mirror plate along a corner of the mirror plate.

Figure 7:
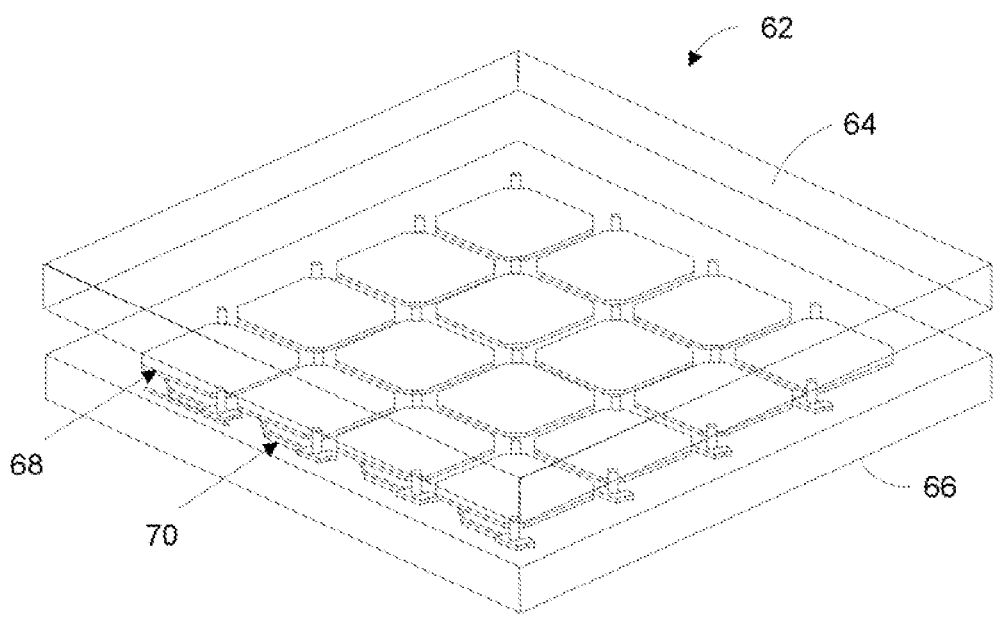
FIG. 7 illustrates an exemplary micromirror array having an array of micromirrors in FIG. 5.

Referring to FIG. 7, an exemplary spatial light modulator having an array of micromirrors of FIG. 5 is illustrated therein. For simplicity purposes, only 4×4 micromirrors are presented. In general, the micromirror array of a spatial light modulator consists of thousands or millions of micromirrors, the total number of which determines the resolution of the displayed images. For example, the micromirror array of the spatial light modulator may have 640×480 (VGA) or higher, such as 800×600 (SVGA) or higher, 1024×768 (XGA) or higher, 1280×1024 (SXGA) or higher, 1280×720 or higher, 1400×1050 or higher, 1600×1200 (UXGA) or higher, and 1920×1080 or larger number of micromirrors. In other applications, the micromirror array may have fewer numbers of micromirrors.

In this example, the array of deflectable reflective mirror plates 68 is disposed between light transmissive substrate 64 and semiconductor substrate 66 having formed thereon an array of addressing electrodes 70 each of which is associated with a mirror plate for electrostatically deflecting the mirror plate. The posts of the micromirrors can be covered by light blocking pads for reducing expected light scattering from the surfaces of the posts.

The micromirrors in the array can be arranged in many suitable ways. For example, the micromirrors can be arranged such that the center-to-center distance between the adjacent mirror plates can be 10.16 microns or less, such as 4.38 to 10.16 microns. The nearest distance between the edges of the mirror plate can be from 0.1 to 1.5 microns, such as from 0.15 to 0.45 micron, as set forth in U.S. patent application Ser. No. 10/627,302, Ser. No. 10/627,155, and Ser. No. 10/627,303, both to Patel, filed Jul. 24, 2003, the subject matter of each being incorporated herein by reference.

Figure 8:
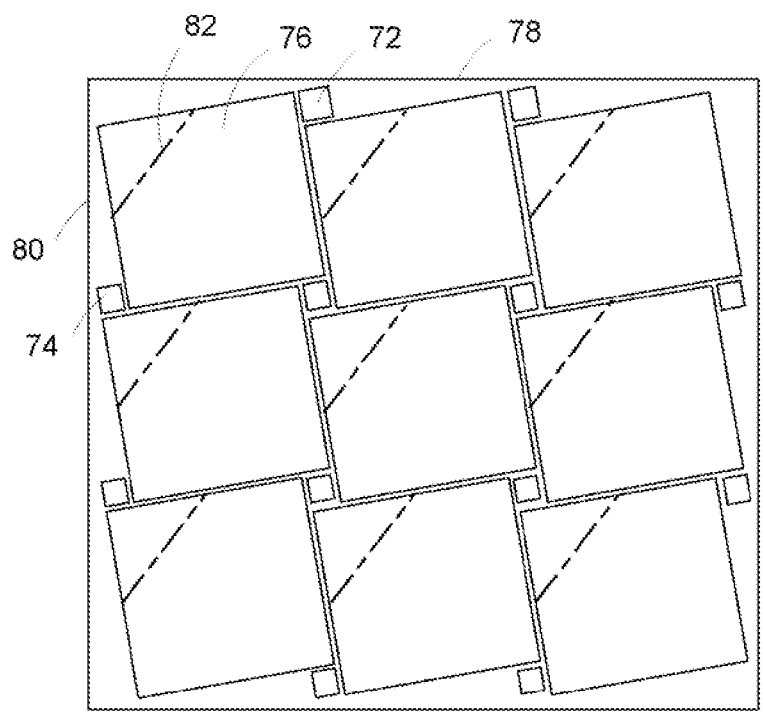
FIG. 8 is a top views of a portion of another exemplary micromirror array having an array of micromirrors in FIG. 5.

The micromirrors in the micromirror array of the spatial light modulator can be arranged in alternative ways, another one of which is illustrated in FIG. 8. Referring to FIG. 8, each micromirror is rotated around its geometric center an angle less than 45° degrees. The posts (e.g. 72 and 74) of each micromirror (e.g. mirror 76) are then aligned to the opposite edges of the mirror plate. No edges of the mirror plate are parallel to an edge (e.g. edges 78 and 80) of the micromirror array. The rotation axis (e.g. axis 82) of each mirror plate is parallel to but offset from a diagonal of the mirror plate when viewed from the top of the mirror plate at a non-deflected state.

Figure 9:
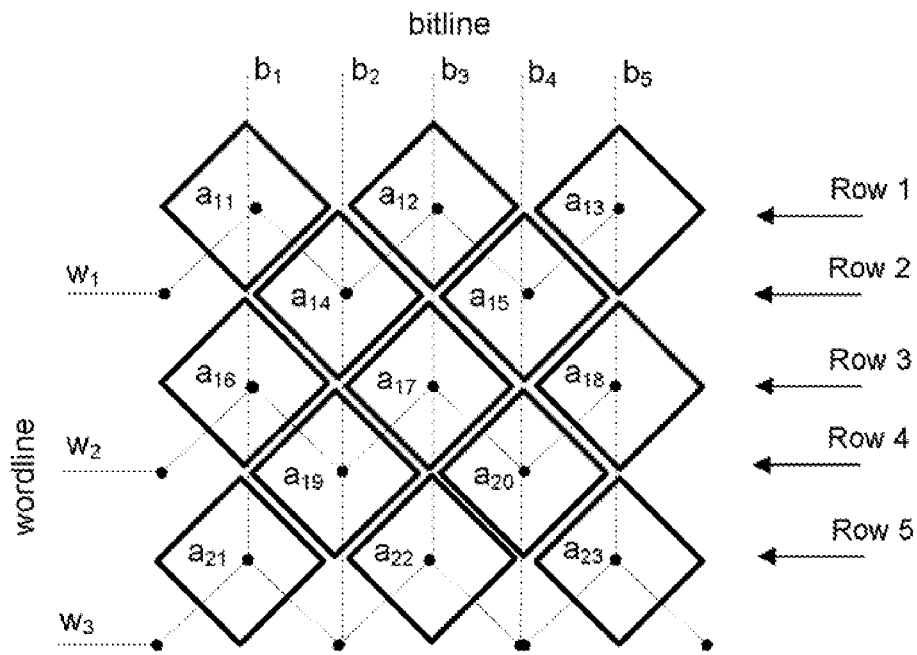
FIG. 9 is a top view of a portion of yet another exemplary micromirror array having an array of micromirrors in FIG. 5.

FIG. 9 illustrates the top view of another micromirror array having an array of micromirrors of FIG. 3. In this example, each micromirror is rotated 45° degrees around its geometric center. For addressing the micromirrors, the bitlines and wordlines are deployed in a way such that each column of the array is connected to a bitline but each wordline alternatively connects micromirrors of adjacent rows. For example, bitlines $b_1$, $b_2$, $b_3$, $b_4$, and $b_5$ respectively connect micromirrors groups of ($a_{11}$, $a_{16}$, and $a_{21}$), ($a_{14}$ and $a_{19}$), ($a_{12}$, $a_{17}$, and $a_{22}$), ($a_{15}$ and $a_{20}$), and ($a_{13}$, $a_{18}$, and $a_{23}$). Wordlines $w_1$, $w_2$, and $w_3$ respectively connect micromirror groups ($a_{11}$, $a_{14}$, $a_{12}$, $a_{15}$, and $a_{13}$), ($a_{16}$, $a_{19}$, $a_{17}$, $a_{20}$, and $a_{18}$), and ($a_{21}$, $a_{22}$, and $a_{23}$). With this configuration, the total number of wordlines is less than the total number of bitlines.

Figure 10:
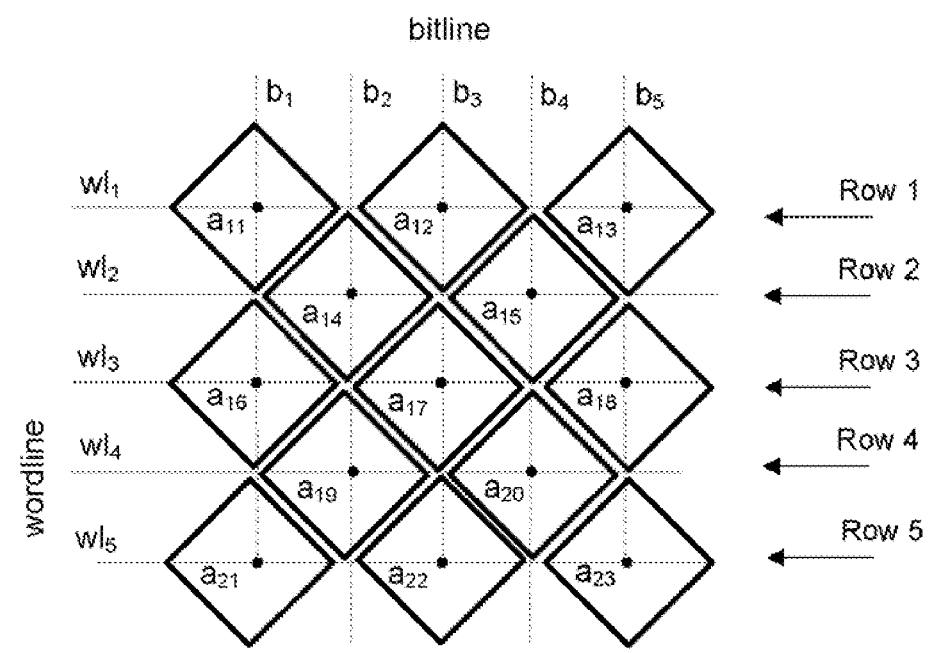
FIG. 10 is a top view of a portion of yet another exemplary micromirror array having an array of micromirrors in FIG. 5.

For the same micromirror array, the bitlines and wordlines can be deployed in other ways, such as that shown in FIG. 10.

Referring to FIG. 10, each row of micromirrors is provided with one wordline and one bitline. Specifically, bitlines $b_1$, $b_2$, $b_3$, $b_4$ and $b_5$ respectively connect column 1 (comprising micromirrors $a_{11}$, $a_{16}$, and $a_{21}$), column 2 (comprising micromirrors $a_{14}$ and $a_{19}$), column 3 (comprising micromirrors $a_{12}$, $a_{17}$, and $a_{22}$), column 4 (comprising micromirrors $a_{15}$ and $a_{20}$), and column 5 (comprising micromirrors $a_{13}$, $a_{18}$, and $a_{23}$). Wordlines $WL_1$, $WL_2$, $WL_3$, $WL_4$, and $WL_5$ respectively connect row 1 (comprising micromirrors $a_{11}$, $a_{12}$, and $a_{13}$), row 2 (comprising micromirrors $a_{14}$ and $a_{15}$), row 3 (comprising micromirrors $a_{16}$, $a_{17}$, and $a_{18}$), row 4 (comprising micromirrors $a_{19}$ and $a_{20}$) and row 5 (comprising micromirrors $a_{21}$, $a_{22}$, and $a_{23}$).

Figure 11A:
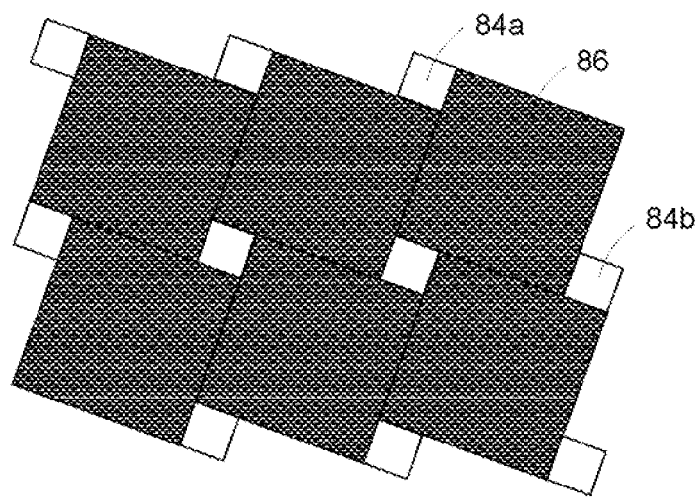
FIG. 11a illustrates a top view of a portion of an array of micromirrors usable in the spatial light modulator.
Figure 11B:
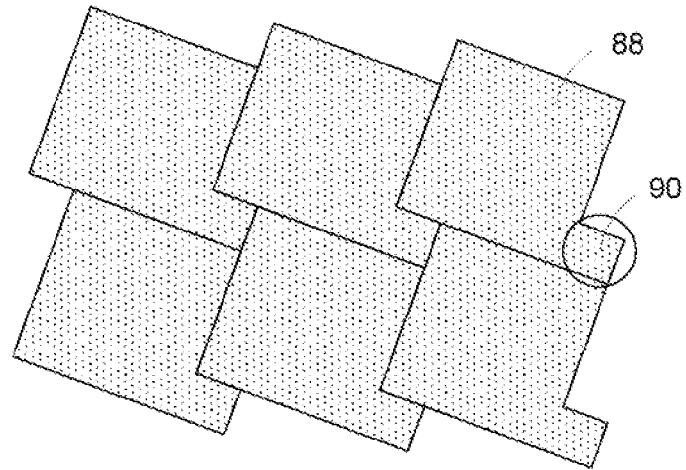
Figure 11C:
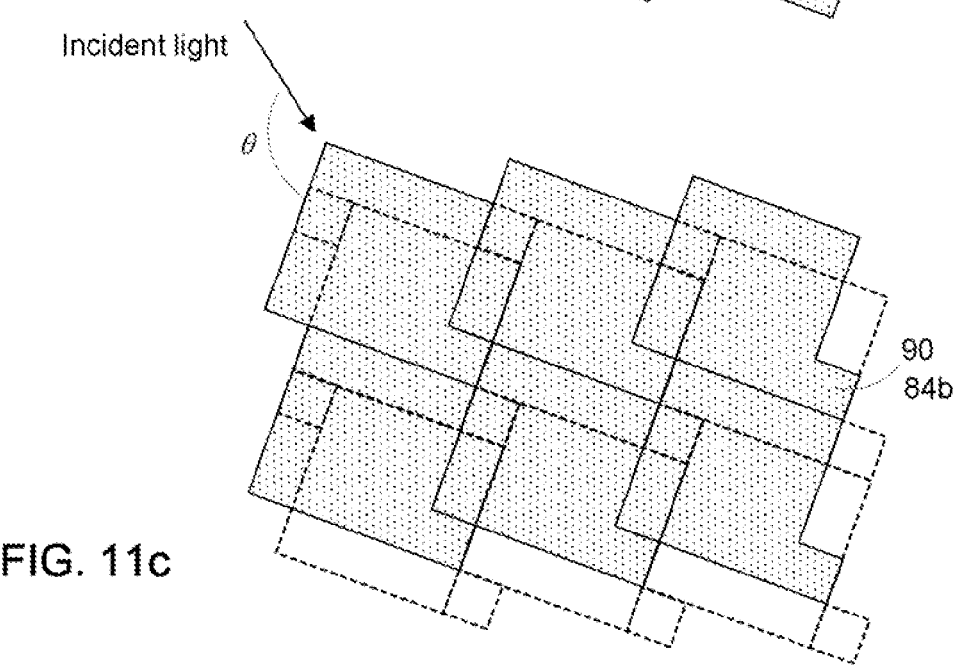
FIG. 11c illustrates a top view of an assembly having the micromirror array in FIG. 12a and the addressing electrode array in FIG. 11b.

As an example, the mirror plates of the micromirrors in the array can form a plurality of pockets, in which posts can be formed, wherein the pockets are covered by the extended areas of the addressing electrodes when viewed from the top of the micromirror array device, as shown in FIGS. 11a to 11c.

Referring to FIG. 11a, a portion of an array of mirror plates of the micromirrors is illustrated therein. The mirror plates in the array form a plurality of pockets in between. For example, pockets 84a and 84b are formed in which posts for supporting and holding mirror plate 86 can be formed. For individually addressing and deflecting the mirror plates in FIG. 11a, an array of addressing electrodes is provided, a portion of which is illustrated in FIG. 11b.

Referring to FIG. 11b, each addressing electrode has an extended portion, such as extended portion 90 of addressing electrode 88. Without the extended portion, the addressing electrode can be generally square, but having an area equal to or smaller than the mirror plate.

FIG. 11c illustrates a top view of a micromirror array device after the addressing electrodes in FIG. 11b and the mirror plates in FIG. 11a are assembled together. It can be seen in the figure that each addressing electrode is displaced a particular distance along a diagonal of the mirror plate associated with the addressing electrode. As a result, the pockets presented between the mirror plates are covered by the addressing electrode, specifically by the extended portions of the addressing electrodes. In this way, light scattering otherwise occurred in the substrate having the addressing electrodes can be removed. The quality, such as the contrast ratio of the displayed images can be improved.

Figure 12:
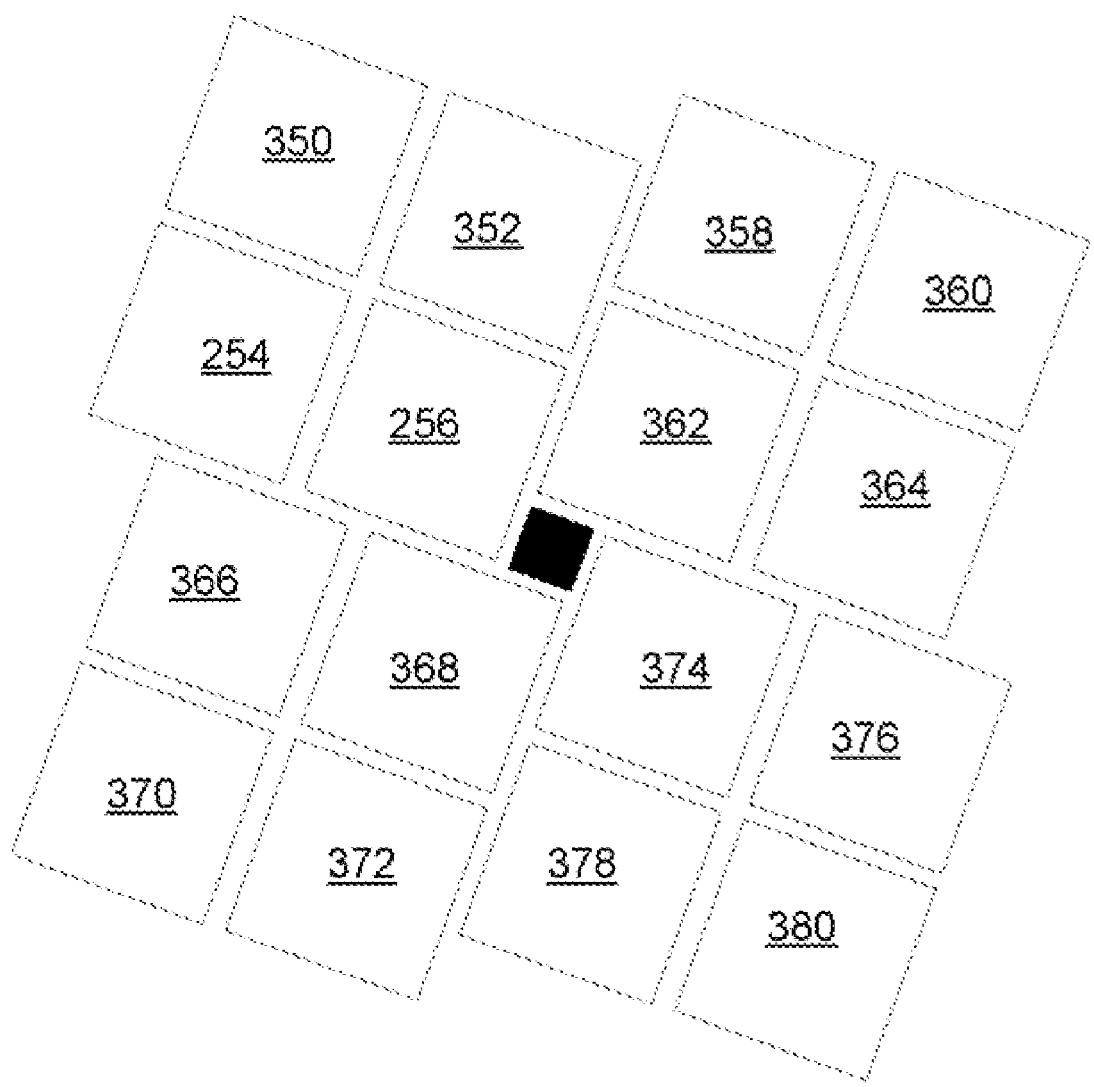
FIG. 12 is a top view of a portion of yet another exemplar micromirror array having an array of micromirrors in FIG. 5.

In an array of micromirror devices, such as the device shown in FIG. 3, post can be provided for selected (e.g. not all) the micromirror devices of the array, as that set froth in U.S. patent application Ser. No. 10/969,251 and Ser. No. 10/969,503 both filed Oct. 19, 2004, the subject matter of each being incorporated herein by reference in entirety. An example of such micromirror array device is illustrated in a top view in FIG. 12. For simplicity purposes, only sixteen micromirror devices of the micromirror array device are illustrated. In this specific example, every four adjacent micromirrors are formed into a micromirror group, such as the group comprising micromirrors 350, 352, 254, and 356, the group comprising 358, 360, 362, and 364, the group comprising micromirrors 366, 368, 370, and 372, and the group comprising micromirrors 374, 376, 378 and 380. Adjacent groups (e.g. the above four micromirror groups) share a post that is represented by the black square for supporting the mirror plates of the micromirrors in the four micromirror groups. The exposed surface of the post can be covered by a light blocking film. In general, the posts of a micromirror array device, wherein not all micromirrors are provided with a post, can all be coated with light blocking pads. Alternatively, only a number of (but not all) the posts are coated with light blocking pads.

In practical applications, the micromirror arrays are generally packaged for protection, as described in U.S. patent application Ser. No. 10/443,318 filed May 22, 2003, and Ser. No. 10/852,981 filed May 24, 2004, the subject matter of each being incorporated herein by reference. The micromirror packages are often packaged between a package substrate having a supporting surface to which the micromirror array device is attached, and a package cover, which is transmissive to visible light and is hermetically bonded to the package substrate. A light blocking film can also be deposited on the package cover, preferably in the form of a frame surrounding the micromirror array, as set forth in U.S. patent application Ser. No. 10/969,258, now U.S. Pat. No. 7,042,623, "Light Blocking Layer in MEMS Package", filed along with the present application. In particular, package cover can be slanted so as to improve the transmission of the incident light, as set forth in U.S. patent Ser. No. 10/343,307, filed Jan. 29, 2003, the subject matter being incorporated herein by reference.

Figure 13:
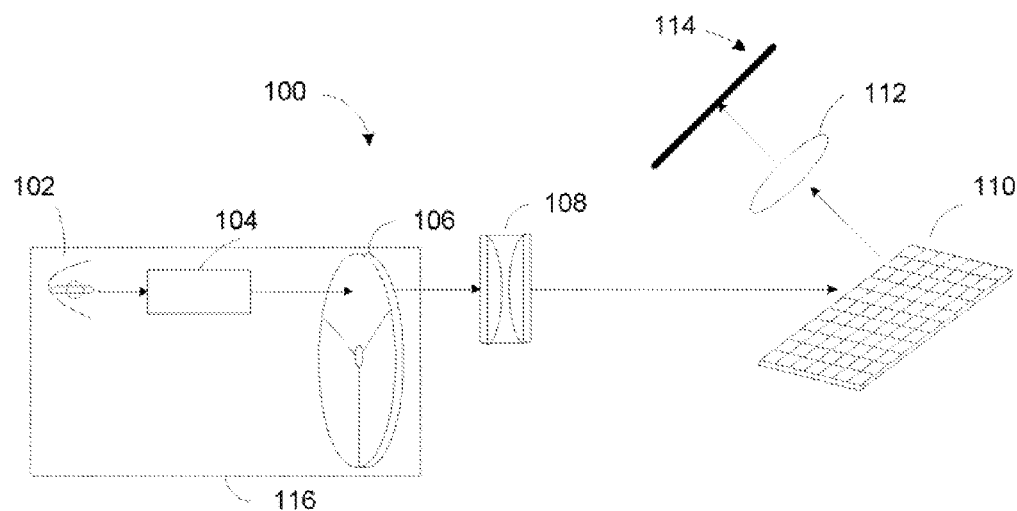
FIG. 13 is an exemplary display system employing a spatial light modulator having an array of micromirror devices in FIG. 5.

The micromirror device having tapered mirror plates has many applications, one of which is display systems. An exemplary micromirror based display system is illustrated in FIG. 13. In its basic configuration, display system 100 comprises illumination system 116 for producing sequential color light, spatial light modulator 110, optical element 108 for directing illumination light from the illumination system onto the spatial light modulator, and optical element 112 that projects the reflected illumination light onto display target 114.

Illumination system 101 further comprises light source 102, which can be an arc lamp, light pipe 104 that can be any suitable integrator of light or light beam shape changer, and color filter 106, which can be a color wheel. The filter in this particular example is positioned after light pipe 104 at the propagation path of the illumination light. In another example, the color filter can be positioned between the light source and light pipe 104, which is not shown in the figure.

An exemplary rear-projection system having a reduced dimension is set forth in US patent application, publication No. US20040114230 to Peterson et al, filed Dec. 5, 2003, the subject matter being incorporated herein by reference. More complex display systems are also applicable, especially those having more than one spatial light modulator for color images, such as the display system in FIG. 14.

Figure 14:
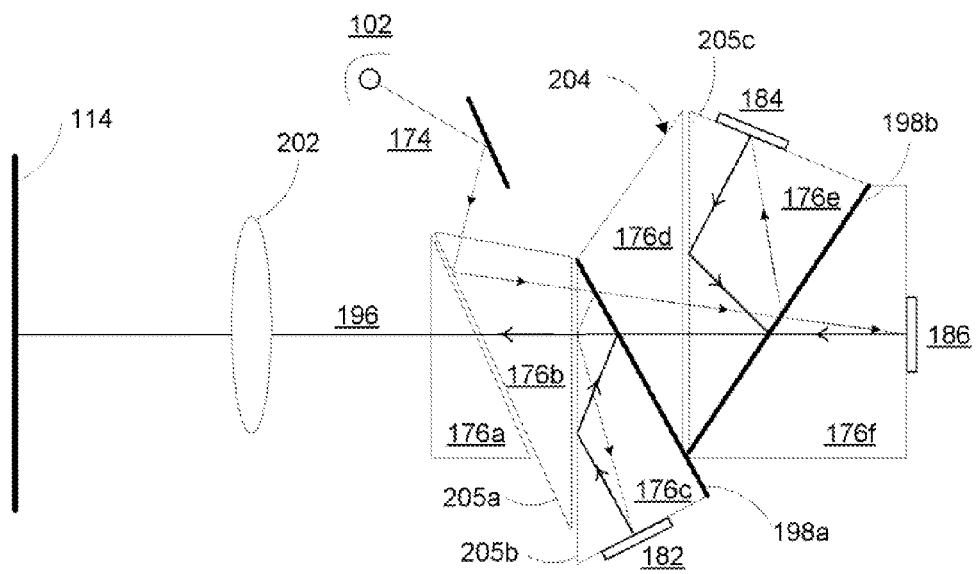
FIG. 14 is an exemplary display system employing a spatial light modulator having an array of micromirror devices in FIG. 5.

Referring to FIG. 14, another exemplary display system employing three spatial light modulators, each comprising an array of micromirrors and being designated for respectively modulating the multi-color (e.g. three color such as red, green and blue) light beams, is presented therein. The display system employs a dichroic prism assembly 204 for splitting incident light into three primary color light beams. Dichroic prism assembly comprises TIR 176a, 176c, 176d, 176e and 176f. Totally-internally-reflection (TIR) surfaces, i.e. TIR surfaces 205a, 205b and 205c, are defined at the prism surfaces that face air gaps. The surfaces 198a and 198b of prisms 176c and 176e are coated with dichroic films, yielding dichroic surfaces. In particular, dichroic surface 198a reflects green light and transmits other light. Dichroic surface 198b reflects red light and transmits other light. The three spatial light modulators, 182, 184 and 186, each having a micromirror array device, are arranged around the prism assembly.

In operation, incident white light 174 from light source 102 enters into TIR 176a and is directed towards spatial light modulator 186, which is designated for modulating the blue light component of the incident white light. At the dichroic surface 198a, the green light component of the totally internally reflected light from TIR surface 205a is separated therefrom and reflected towards spatial light modulator 182, which is designated for modulating green light. As seen, the separated green light may experience TIR by TIR surface 205b in order to illuminate spatial light modulator 182 at a desired angle. This can be accomplished by arranging the incident angle of the separated green light onto TIR surface 205b larger than the critical TIR angle of TIR surface 205b. The rest of the light components, other than the green light, of the reflected light from the TIR surface 205a pass through dichroic surface 198a and are reflected at dichroic surface 198b. Because dichroic surface 198b is designated for reflecting red light component, the red light component of the incident light onto dichroic surface 198b is thus separated and reflected onto spatial light modulator 184, which is designated for modulating red light. Finally, the blue component of the white incident light (white light 174) reaches spatial light modulator 186 and is modulated thereby. By collaborating operations of the three spatial light modulators, red, green and blue lights can be properly modulated. The modulated red, green and blue lights are recollected and delivered onto display target 114 through optic elements, such as projection lens 202, if necessary.

The spatial light modulator, in general, comprises an array of a hundred thousands or more, or a million or more of micromirrors, the total number of which determines the resolution of the displayed images. For example, the micromirror array of the spatial light modulator may have 640×480 (VGA) or higher, such as 800×600 (SVGA) or higher, 1024×768 (XGA) or higher, 1280×1024 (SXGA) or higher, 1280×720 or higher, 1400×1050 or higher, 1600×1200 (UXGA) or higher, and 1920×1080 or even larger number of micromirrors. In other applications, the micromirror array may have fewer micromirrors. Each of the micromirror devices in the spatial light modulators preferably comprises a mirror plate as discussed above with reference to FIG. 1 to FIG. 2B.

When used in spatial light modulators of display systems as shown in FIG. 13 and FIG. 14, the incident light beam is directed onto the mirror plates in a direction along the displacement direction of the addressing electrodes when viewed from the top of the addressing electrodes as shown in the figure. For example, the incident light has an angle θ to an edge of the addressing electrode (or the mirror plate) when viewed from the top; and the angle can be 135° degrees.

The mirror plates with tapered side walls as discussed above can be fabricated in many ways. As a way of example, a method for making the mirror plate of the micromirror device in FIG. 1 is demonstratively illustrated in FIGS. 15a to 15c.

Figure 15A:
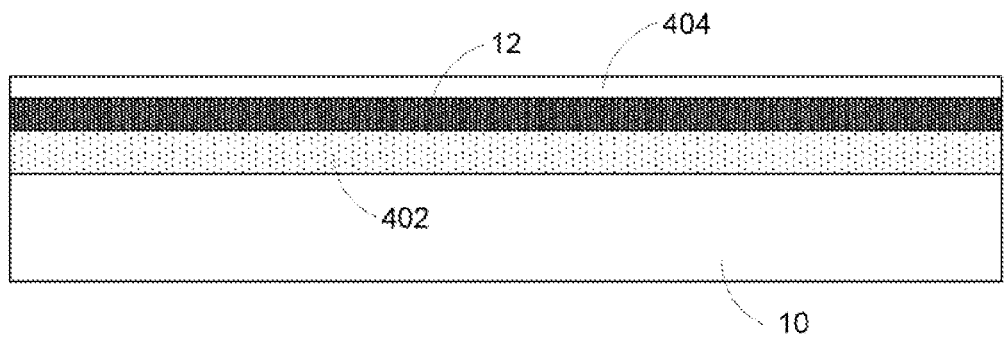
FIG. 15a to FIG. 15c show an exemplary fabrication method for making the mirror plates with tapered sides.
Figure 15B:
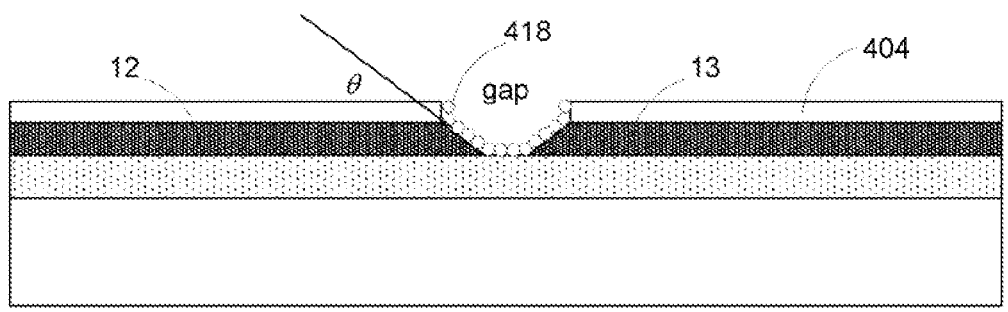

Referring to FIG. 15a, substrate 10 is a light transmissive substrate. Sacrificial layer 402 composed of a sacrificial material, such as amorphous silicon or any other suitable sacrificial material is deposited on substrate 10. Mirror plate layer comprising a desired mirror plate layer, such as aluminum, $SiN_x$, and $SiO_x$ is deposited on sacrificial layer 402, followed by deposition of photoresist 404. With the aid of the photoresist, the mirror plate layer is patterned into a desired shape, as those illustrated in FIG. 3 to FIG. 6. The patterning may use a standard photoresist patterning followed by etching using, for example, plasma, $CF_4$, $Cl_2$, or other suitable etchant depending upon the specific material of the micromirror plate layer. Alternatively, the patterning of the mirror plate can be accomplished with a chlorine chemistry or a fluorine chemistry where the etchant is a perfluorocarbon or hydrofluorocarbon (or $SF_6$) that is energized so as to selectively etch the mirror plate layers both chemically and physically (e.g. a plasma/RIE etch with $CF_4$, $CHF_3$, $C_3F_8$, $CH_2F_2$, $C_2F_6$, $SF_6$, etc. or more likely combinations of the above or with additional gases, such as $CF_4/H_2$, $SF_6/Cl_2$, or gases using more than one etching species such as $CF_2Cl_2$, all possibly with one or more optional inert diluents). Different etchants may be employed for etching the mirror plate, especially when the mirror plate comprises multiple layers of different materials (e.g. chlorine chemistry for a metal layer, hydrocarbon or fluorocarbon (or $SF_6$) plasma for silicon or silicon compound layers, etc.).

During the pattering, etching by-product 418, such as polymer, spontaneously deposits on the surfaces of etching area 15 that is the edge of the mirror plate. When multiple mirror plates, such as mirror plates 12 and 13 of a micromirror array are to be formed, etching area 15 can be the gap between the adjacent mirror plates. The deposited by-product resists the etching process but with different resistances. As a result, the etching process encounters higher resistant on the side walls of etching area 15 coated with the by-product than on the bottom of etching area 15. Given this fact, the ratio of the etching rates on the said walls and the bottom of the etching area can be modified such that the etched mirror plate edge has the desired angle θ. The etching ratio can be modified through adjusting the etching compositions and other etching parameters, such as the etching temperature, etching pressure, and the flux rate of the etchant and/or etching by-products out from the etching chamber.

Following the patterning of the mirror plate, other members of the micromirror device can be fabricated, as set forth in US patents and patent applications, U.S. Pat. No. 5,835,256 filed Nov. 10, 2003, Ser. No. 10/005,308 filed Dec. 3, 2001, Ser. No. 10/099,314 filed Mar. 15, 2002, Ser. No. 09/954,864 filed Sep. 17, 2001, Ser. No. 10/104,109 filed Mar. 22, 2002, Ser. No. 10/343,307 filed Jan. 29, 2003, Ser. No. 10/366,296 filed Feb. 12, 2003, Ser. No. 10/627,302 filed Jul. 24, 2003, Ser. No. 10/627,155 filed Jul. 24, 2003, Ser. No. 10/613,379 filed Jul. 3, 2003, the subject matter of each being incorporated herein by reference in entirety.

Figure 15C:
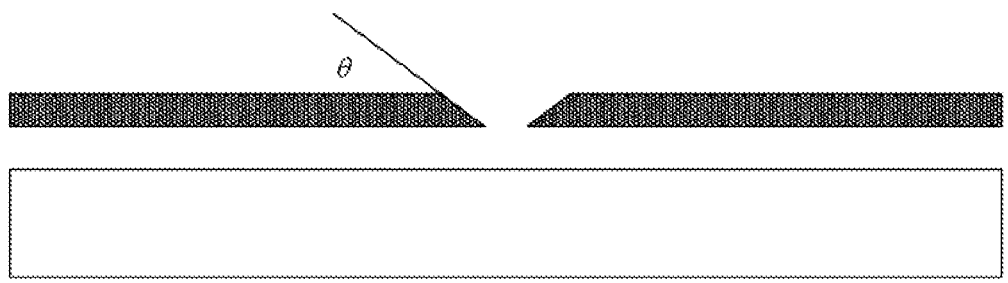

After forming all members of the micromirror device, the micromirror device is released by removing the sacrificial materials of the first and second sacrificial layers, a cross-sectional view of which is presented in FIG. 15c. In order to efficiently remove the sacrificial material (e.g. amorphous silicon), the release etching utilizes an etchant gas capable of spontaneous chemical etching of the sacrificial material, preferably isotropic etching that chemically (and not physically) removes the sacrificial material. Such chemical etching and apparatus for performing such chemical etching are disclosed in U.S. patent application Ser. No. 09/427,841 to Patel et al. filed Oct. 26, 1999, and in U.S. patent application Ser. No. 09/649,569 to Patel at al. filed Aug. 28, 2000, the subject matter of each being incorporated herein by reference. Preferred etchants for the release etch are gas phase fluoride etchants that, except for the optional application of temperature, are not energized. Examples include HF gas, noble gas halides such as xenon difluoride, and interhalogens such as $IF_5$, $BrCl_3$, $BrF_3$, $IF_7$ and $ClF_3$. The release etch may comprise inner gas components such as ($N_2$, Ar, Xe, He, etc.). In this way, the remaining sacrificial material is removed and the micromechanical structure is released. In one aspect of such an embodiment, $XeF_2$ is provided in an etching chamber with diluents (e.g. $N_2$ and He). The concentration of $XeF_2$ is preferably 8 Torr, although the concentration can be varied from 1 Torr to 30 Torr or higher. This non-plasma etch is employed for preferably 900 seconds, although the time can vary from 60 to 5000 seconds, depending on temperature, etchant concentration, pressure, quantity of sacrificial material to be removed, or other factors. The etch rate may be held constant at 18 Å/s/Torr, although the etch rate may vary from 1 Å/s/Torr to 100 Å/s/Torr. Each step of the release process can be performed at room temperature.

In addition to the above etchants and etching methods mentioned for use in either the final release or in an intermediate etching step, there are others that may also be used by themselves or in combination. Some of these include wet etches, such as ACT, KOH, TMAH, HF (liquid); oxygen plasma, $SCCO_2$, or super critical $CO_2$ (the use of super critical $CO_2$ as an etchant is described in U.S. patent application Ser. No. 10/167,272, which is incorporated herein by reference). However, spontaneous vapor phase chemical etchants are more preferred, because the sacrificial material, such as amorphous silicon within small spaces, and small gap can be efficiently removed via gaps between adjacent mirror plates and the lateral gap as compared to other sacrificial materials (e.g. organic materials) and other etching methods. Though not required in all examples, a micromirror array with a small gap, a small pitch and a small distance between the hinge and the mirror plate can thus be more easily fabricated with such spontaneous vapor phase chemical etchants, as set forth in U.S. patent application Ser. No. 10/627,155 filed Jul. 24, 2003, Ser. No. 10/666,671 filed Sep. 17, 2003, and Ser. No. 10/666,002 filed Sep. 17, 2003, the subject matter of each being incorporated herein by reference.

Another exemplary method for making the mirror plate in FIG. 2C on a substrate that can a light transmissive substrate or a semiconductor substrate is demonstratively illustrated in FIG. 16a to FIG. 16d.

Figure 16A:
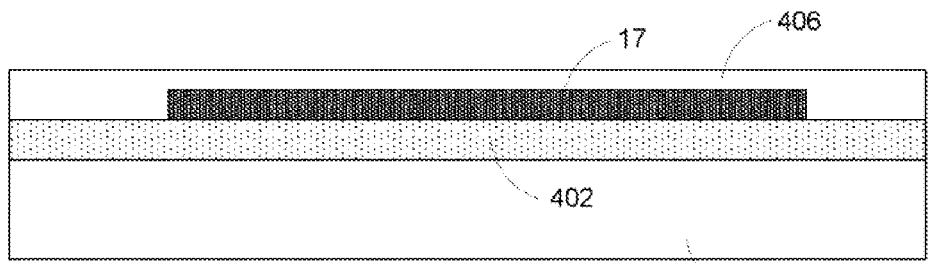
FIG. 16a to FIG. 16d show another exemplary fabrication method for making the mirror plates with tapered sides.

Referring to FIG. 16a, substrate 11 can be a light transmissive substrate or a semiconductor substrate. Sacrificial layer 402, such as a layer comprising amorphous silicon is deposited on the substrate. First portion 17 of the mirror plate is deposited and patterned on sacrificial layer 402. Sacrificial layer 406, which may or may not be the same as sacrificial layer 402 is deposited on the patterned mirror plate. Sacrificial layer 406 is then patterned according to another portion (e.g. the remaining portion) of the mirror plate, as shown in FIG. 16b.

Figure 16B:
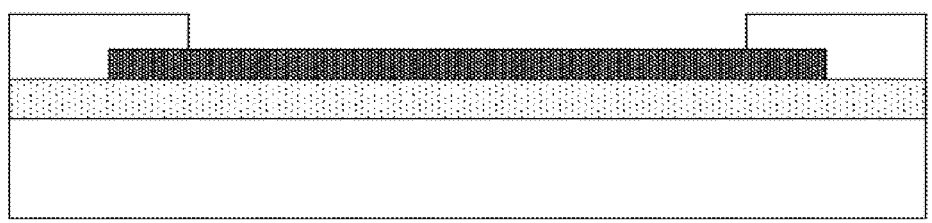

Referring to FIG. 16b, it is assumed that substrate 11 is a light transmissive substrate, such as glass, quartz, and sapphire; and the mirror plate is formed on the light transmissive substrate. The remaining portion of the mirror plate is preferably shorter than the formed portion 17. Accordingly, sacrificial layer 406 is patterned such that removed portion of the sacrificial layer is shorter than the patterned portion 17 of the mirror plate. The relative lengths of the portions 17 and 408 satisfy the requirement as discussed with reference to FIG. 2c and FIG. 2d.

Figure 16C:
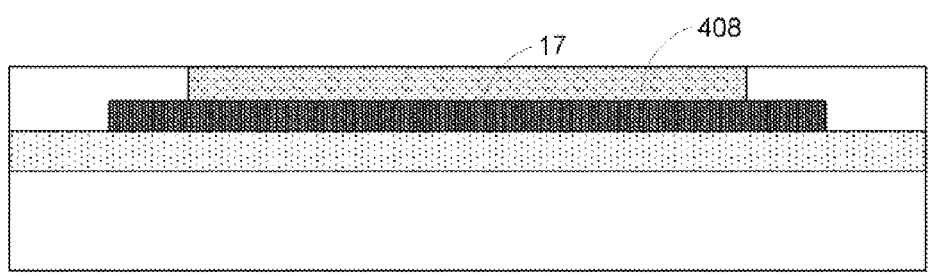
Figure 16D:
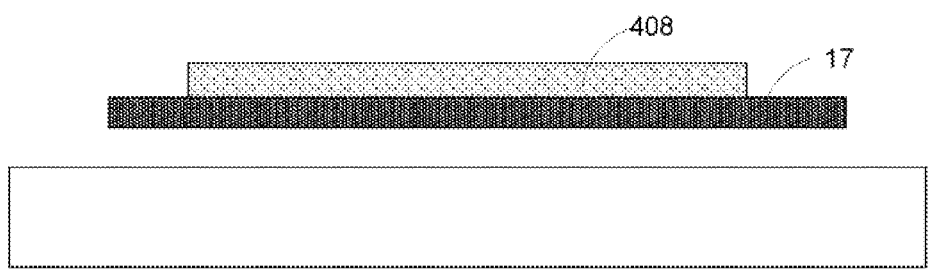

After patterning sacrificial layer 406, mirror plate portion 408 is deposited, as shown in FIG. 16c. The deposited mirror plate portion 408 may further be modified so as to obtain the desired thickness, using for example, a chemical-mechanical-polishing technique or another suitable process. After forming all members of the micromirror device, the micromirror device is released by removing the sacrificial materials of the first and second sacrificial layers, a cross-sectional view of which is presented in FIG. 16d. The etching method for removing the sacrificial layer as discussed above with reference to FIG. 15c can be employed herein, which will not be repeated herein.

It is noted that the mirror plate portions 17 and 408 may or may not comprise the same material. Moreover, more portions in addition to portions 17 and 408 can be formed. When more portions are formed, it is preferred that portions of the mirror plates satisfy the requirements discussed above with reference to FIG. 2D. If the multiple portions of the mirror plate comprise different materials, different patterning processes, such as different etching processes, can be used depending upon the specific materials of the target portion to be etched of the mirror plate.

If substrate 11 is a semiconductor substrate on which the mirror plate is to be formed, sacrificial layer 406 can be patterned such that the removed portion of sacrificial layer 406 is longer than the formed portion 17 of the mirror plate. Then after depositing portion 408 of the mirror plate, portion 408 will be longer than portion 17 of the mirror plate. In fact, the relative lengths of the portions of the mirror plate depend upon the incident light direction. In general, the closer to the incident light, the longer the portions of the mirror plate are. To guarantee that there is substantially no portion of the side wall of the formed mirror plate being exposed to the incident light, it is preferred that portions of the mirror plates satisfy the requirements discussed above with reference to FIG. 2D.

Figure 17A:
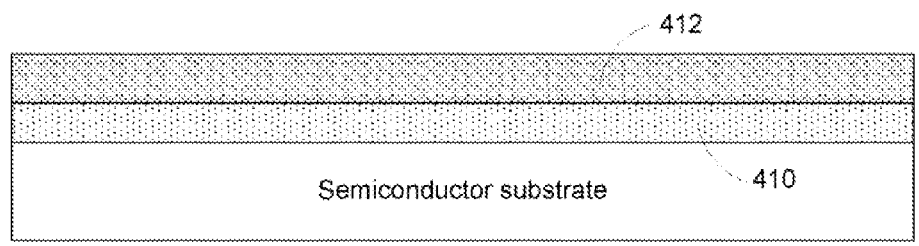
FIG. 17a to FIG. 17d show another exemplary fabrication method for making the mirror plates with tapered sides.
Figure 17B:
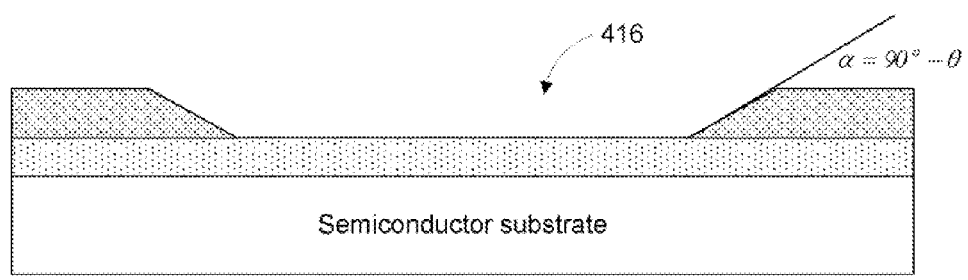

Other than the method discussed above for forming a tapered mirror plate on a semiconductor substrate, another method for the same purpose is illustrated in FIG. 17a to FIG. 17d. Referring to FIG. 17a, sacrificial layer 410 is formed on the semiconductor substrate followed by forming another sacrificial layer 412, which may or may not be the same as sacrificial layer 410. Sacrificial layer 410 is patterned so as to formed mirror plate region 416. The side walls of mirror plate region 416 have a slope angle $\alpha=90°-\theta$, as shown in FIG. 17b. Such angle can be accomplished with the same etching process discussed above with reference to FIG. 15b.

Figure 17C:
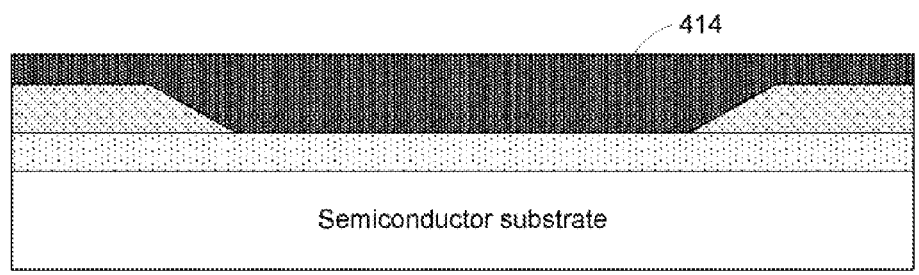
Figure 17D:
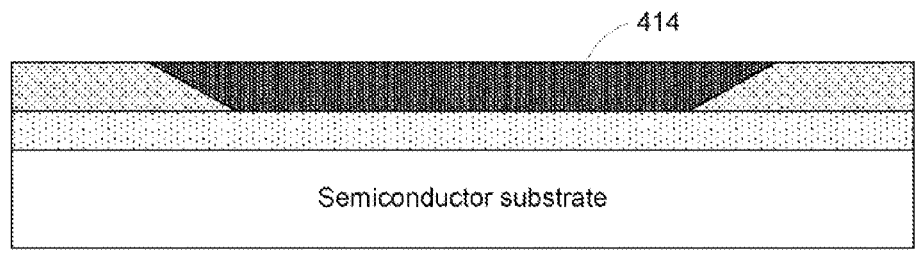

On the patterned sacrificial layer 412 and sacrificial layer 410, mirror plate layer 414 is deposited, as shown in FIG. 17c. The deposited mirror plate thus has a tapered side wall with the desired angle $\theta$. The deposited mirror plate can then be modified to obtain the desired thickness, using for example, a standard chemical-mechanical-process.

Figure 18:
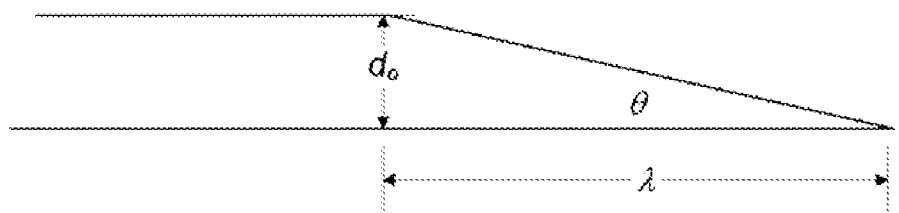
FIG. 18 illustrates an exemplary mirror plate with a tapered edge.

In an alternative example, the mirror plates can be formed a reflective material, such as a metallic material, which may be transmissive when the thickness of such material is below a certain value, as shown in FIG. 18.

Referring to FIG. 18, a portion of the mirror plate with a tapered portion is demonstratively illustrated therein. The mirror plate has an edge whose thickness diminishes from $d_o$ to an end value, such as 0, within distance $\lambda$ along the length of the mirror plate. In one example, $\lambda$ can be the average wavelength of the incident light, or any other characteristic values of the material of the mirror plate. $d_o$ can be a value above which the intensity of the incident light passing through the mirror plate decays below a pre-determined threshold, such as 1/e, as shown in FIG. 19.

Figure 19:
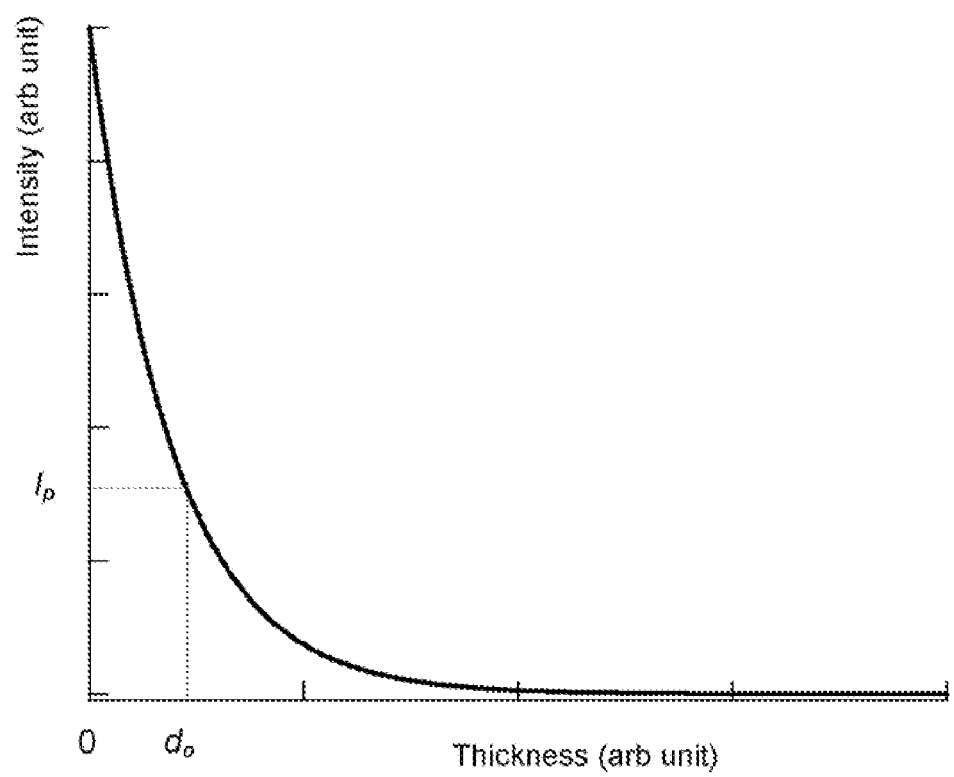
FIG. 19 schematically illustrates a plot of the transitivity of the light to a material used for the mirror plate in FIG. 18.

Referring to FIG. 19, a typical transmissive intensity of the incident light (e.g. the nature white light) vs. the thickness of a material, such as aluminum is illustrated therein. The curve can be mathematically expressed as:

$$\gamma = \frac{I}{I_o} = e^{-2k \times d},$$

wherein k is the imaginary part of the refraction index n that is expressed as:

$$\tilde{n}=n_r+n_i\tilde{i}=n_r+k\tilde{i}$$

As shown in FIG. 19, at thickness of $d_o$, the transmissive intensity is reduced to $I_p$, which yields the transmissive intensity rate $\gamma$ to be 1/e. As an example, the mirror plate has a tapered edge whose thickness reduces from a starting value of $d_o$ or less. As one example wherein the material is aluminum, $d_o$ can be 350 angstroms or less, such as 300 angstroms or less, and 250 angstroms or less. The tapered portion may have a length λ of 3000 angstroms or higher, such as 4000 angstroms or higher, and 5000 angstroms or higher. As a result, the angle θ can be 20° degrees or smaller, such as 15° degrees or smaller, 10° degrees or smaller, and 5° degrees or smaller. Over the tapered portion (λ), the tapered mirror plate has a minimum transmissive rate of 70% or more, such as 80% or more, 85% or more, 90% or more, and 98% or more for an incident light with an averaged wavelength from 10° nanometers to 1000 nanometers, and more preferably from 40° nanometers to 700 nanometers, such as visible light. Accordingly, the reflected rate (the ratio of the intensity of the reflected light to the intensity of the incident light) is 30% or less, 20% or less, 15% or less, 10% or less, and 2% or less.

The mirror plate with the tapered edge as discussed above with reference to FIGS. 18 and 19 can be fabricated in many ways, as those discussed above with reference to FIG. 15A to FIG. 17*d*, which will not be repeated herein.

It will be appreciated by those skilled in the art that a new and useful micromirror device having a tapered reflective mirror plate has been described herein. In view of the many possible embodiments, however, it should be recognized that the embodiments described herein with respect to the drawing figures are meant to be illustrative only and should not be taken as limiting the scope of what is claimed. Those of skill in the art will recognize that the illustrated embodiments can be modified in arrangement and detail. Therefore, the devices and methods as described herein contemplate all such embodiments as may come within the scope of the following claims and equivalents thereof.

I claim:

1. A projection system, comprising:
    a light source for producing light;
    an array of reflective and deflectable mirror plates for modulating the light, each mirror plate comprising a reflective surface and a side wall;
    a projection lens through which the modulated light is projected so as to form an image; and
    wherein a side wall of one of the array of mirror plates comprises first and second portions, wherein the first portion has an acute angle θ to the reflective surface, the acute angle θ satisfying: $\theta \leq 90° - \phi - \omega_{OFF} - \beta$, wherein ϕ is an angle between the central axis of an incident light and the normal direction of the mirror plate; wherein $\omega_{OFF}$ is an OFF state angle; and β is angle between the central axis of an incident light cone and an edge ray, the second portion of the side wall recessed from the first portion by a notch portion sufficient to allow the first portion to prevent at least a portion of the light from reaching the second portion of the side wall, the notch portion facing a substrate on which an addressing electrode is formed for electrostatically moving the mirror plate.

2. The system of claim 1, wherein the first portion of the side wall has an acute angle to the reflective surface of the mirror plate, side acute angle is from 32° degrees to 80° degrees.

3. The system of claim 1, wherein the mirror plate with the first and second portions comprises a light blocking and/or absorbing material on a portion of the mirror plate.

4. A spatial light modulator, comprising:
    an array of micromirror devices, at least one of which comprises:
        a reflective mirror plate having a reflective surface and a side wall, the side wall extending a distance defining a thickness for a majority of the mirror plate, wherein the side wall has an acute angle θ to the reflective surface, the acute angle θ satisfying: $\theta \leq 90° - \phi - \omega_{OFF} - \beta$, wherein ϕ is an angle between the central axis of an incident light and the normal direction of the mirror plate; wherein $\omega_{OFF}$ is an OFF state angle; and β is angle between the central axis of an incident light cone and an edge ray; and
        an addressing electrode on a semiconductor substrate for electrostatically moving the mirror plate.

5. The spatial light modulator of claim 4, wherein the first surface is substantially perpendicular to the reflective surface.

6. The spatial light modulator of claim 5, wherein the second surface is disposed substantially parallel to the reflective surface and underneath the reflective surface.

7. A projection system, comprising:
    a light source capable of producing light;
    a spatial light modulator for modulating the light, further comprising an array of deflectable and reflective mirror plates, at least one of which has a reflective surface and a concave side wall, and is formed over a substrate on which an addressing electrode is formed for electrostatically moving the mirror plate; and
    a projection lens through which the modulated light in projected so as to form an image.

8. A spatial light modulator, comprising:
    a deflectable reflective mirror plate having a thickness, reflective surface, and a side wall;
    an addressing electrode on a substrate for deflecting the mirror plate; and
    wherein the side wall comprises a concave surface extending in a direction of the thickness of the reflective mirror plate.

9. The spatial light modulator of claim 8, comprising a second surface opposite the reflective surface, wherein the second surface is smaller than the reflective surface.

* * * * *